Aug. 8, 1933.    R. HEDRICH    1,920,982
METHOD OF PRODUCING BUILDING SLABS
Filed Feb. 17, 1930
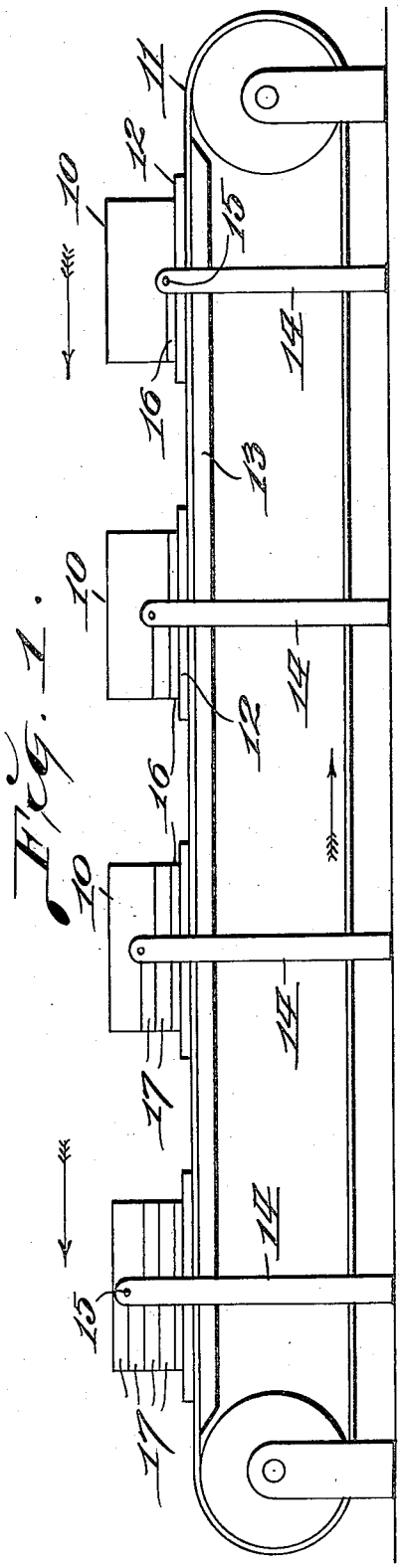
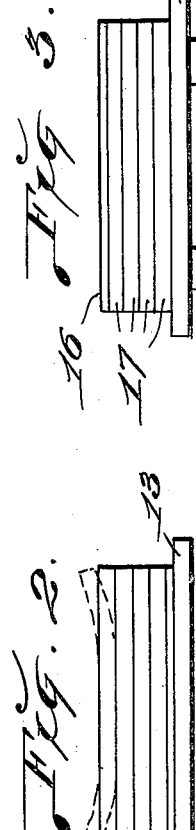
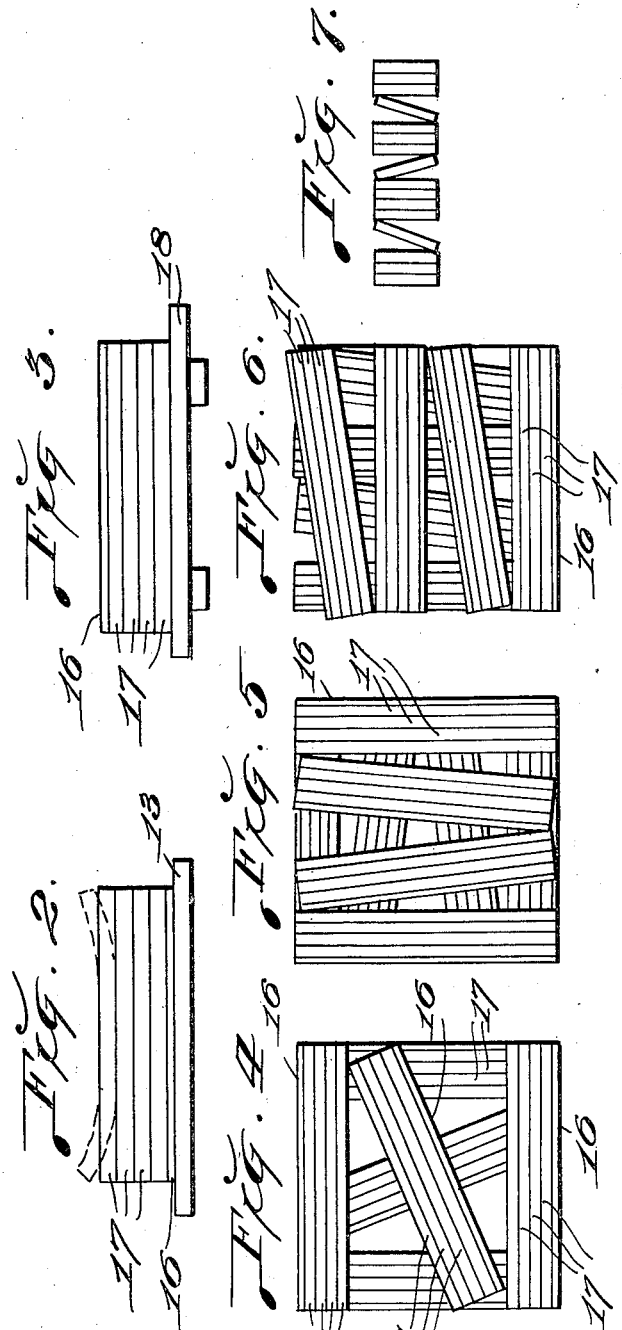
INVENTOR:—
RICHARD HEDRICH.
BY Martin P. Smith, Atty.

Patented Aug. 8, 1933

1,920,982

UNITED STATES PATENT OFFICE 1,920,982

METHOD OF PRODUCING BUILDING SLABS

Richard Hedrich, Los Angeles, Calif., assignor of one-half to Percy R. Bissell, Glendale, Calif.

Application February 17, 1930. Serial No. 429,066

5 Claims. (Cl. 25—156)

My invention relates to a method for producing building slabs and the principal object of my invention is, to provide a relatively simple and easily practiced method whereby building slabs of earthen material may be conveniently and economically produced and which slabs are especially adapted for use as wall and floor tile and for shingle tile in covering roofs.

A further object of my invention is, to provide a method of producing building slabs from clay or other plastic substances and which method will be effective in minimizing production losses, that is the production of slabs that are cracked, broken, warped or otherwise rendered imperfect or unfit for use during the process of manufacture.

Further objects of my invention are, to provide a method of the character referred to wherein the package or series of slabs that are cut from a block of plastic material are prevented from bending or curling during the period required for drying and further, to provide a method wherein the packages of slabs are assembled and laid in the kiln so as to insure, at all times, free passage of heated air between said packages during firing operations.

With the foregoing and other objects in view my invention consists in the various steps hereinafter more fully described and illustrated in the accompanying drawing in which:

Fig. 1 is a side elevational view of an apparatus that may be utilized for cutting a block of plastic material into a series of superimposed slabs and which operation comprises the first step of my improved method.

Fig. 2 is a side elevational view of a package of slabs that have been formed from a block of plastic material in accordance with my invention.

Fig. 3 shows a package of slabs arranged on a base or pallet as is required during the drying of the slabs and before the same are placed in the kiln.

Figs. 4, 5 and 6 are plan views of various arrangements of the packages of slabs when the same are placed in the kiln for firing.

Fig. 7 is an end elevational view of a series of building slabs, as arranged in the kiln in ordinary practice and with certain of the slabs tilted so as to close the flues or heated air circulation spaces between the slabs.

In practicing my improved method with the form of apparatus illustrated in Fig. 1, substantially rectangular blocks 10 of clay or other earthen substances in plastic condition are periodically delivered unto the overrunning portion of a belt or endless carrier 11 and which blocks are mounted on suitable flat bases or pallets 12.

The overrunning portion of the belt traverses a table or other suitable flat support 13 and arranged in the sides of this table and suitably spaced apart are pairs of fixed uprights 14 and arranged between the upper ends of these uprights are transversely disposed wires 15.

The first one of the wires at the receiving end of the belt or endless carrier occupies horizontal position so as to engage the plastic block at a point a slight distance above the upper surface of the pallet on which said block rests, with the result that, as the block passes this first wire, the latter will cut horizontally through the lower portion of the block so as to cut or slice therefrom a relatively thin bottom slab 16.

The succeeding transverse wires or those wires to the rear of the first wire 15 are arranged in different horizontal planes that are spaced equal distances apart so that as the block of plastic material is carried past the succeeding wires the said block will be cut in different horizontal planes so as to provide a plurality of superimposed slabs 17.

These succeeding wires are arranged so that the thickness of the slabs 17 is greater than the thickness of the first slab 16 and further, the thickness of said slabs 17 is such that when they are properly dried and burned they will form finished pieces that may be employed as shingle tile or as wall or floor tile.

Thus when the block of plastic material reaches the end of the belt or conveyor it will have been divided lengthwise on horizontal planes to form a series of slabs of uniform thickness and a single slab or layer at the bottom of the package and which single slab or layer is substantially thinner than the slabs of uniform thickness and said lower thin layer resting directly upon the base or pallet 12.

Immediately after the package of slabs have discharged from the belt or conveyor, said package is turned upside down and positioned on a base or pallet 18 and thus the comparatively thin slab or layer 16, which was previously at the bottom of the package is set at the top of said package and thus serves as a covering member for the package during the time that the same is being dried.

The package is now suitably air dried and as said package is provided with a comparatively thin top layer or covering member, the slabs 17 forming the main body of the package will dry without warping or without the curling up of the ends of the slabs and which undesirable result very frequently occurs in the packages of slabs while the same are being dried and particularly the end portions of the upper one or two of the package of slabs.

Thus the relatively thin slab or layer 16 provides a cover for the body of superimposed slabs while the same are drying and as a result there is a very low percentage of loss of the slabs during the drying operation.

Further, the provision of the covering slab or layer on top of the package prevents the formation of the socalled "scum" or unsightly discoloration which in some materials and especially red burning clays, develops when the faces of the fresh molded or formed slabs are exposed to the air while drying.

After the packages have been properly dried they are removed from the pallets 18 and they are set on edge in tiers in the kiln and each package is arranged so that it occupies an angular position with respect to the next adjacent packages and with the side faces of the packages in contact with each other only at the ends thereof.

Various arrangements of the packages when piled in the kiln are illustrated in Figs. 4, 5 and 6 and as a result of the arrangement of the packages unobstructed air spaces or flues are formed between the packages throughout the height of the piles thereof, thus permitting free circulation of heat through the piled packages and as the end portions of the outside slabs make contact with each other it is impossible for the outer slabs to fall away from the other slabs in the packages and close the air spaces or flues between said packages.

Thus both side and end faces of the packages are wholly exposed to the heat passing upwardly through the flues and consequently the slabs forming the packages will be uniformly burned.

Heretofore it has been the general practice to arrange the packages parallel with each other in each tier or layer with slight spaces between the sides of the packages and where this is done it very frequently happens that the outer slab of a package will fall away from the other slabs and lodge in an inclined position against the side face of the next adjacent package, as illustrated in Fig. 7.

In such cases the air spaces or flues between the tiers of packages will be closed, consequently interfering with the free circulation of heat upwardly between the packages and by my improved arrangement, the slabs in each package are prevented from falling away from the intermediate slabs and thereby closing the air spaces or flues.

The splitting off of the outer slabs of the package generally occurs during the first stages of firing and it is the result of the steam developed in the bounds or lines of division between the slabs.

By arranging the package of slabs so that each package is slightly inclined with respect to the adjacent packages and permitting the ends of the packages to make direct contact with each other or the slabs in each package are retained in proper position during firing and as a result all packages are uniformly burned and kiln losses are minimized.

After the packages have been properly fired and removed from the kiln the slabs forming the packages are divided along the lines of cleavage and the thin cover slabs are discarded.

While I have shown in Fig. 1 a relatively simple and practical form of apparatus for dividing the blocks of plastic material into packages of slabs, it will be understood that any other convenient form of apparatus that will accomplish practically the same result may be utilized. Further it will be noted that each block is cut in horizontal planes to form the superimposed slabs and this is an advantage for the reason that the weight of the slabs one upon the other, bonds the same to each other to a sufficient degree so that each block of slabs may be readily handled when removed with the pallet from the carrier and all of the slabs of each block will retain their proper positions without tendency to separate from each other.

Thus it will be seen that I have provided a relatively simple and easily practiced method for producing building slabs and which method is highly effective in minimizing losses during manufacture and the production of inferior or substandard slabs.

I claim as my invention:

1. The herein described method of producing building slabs which consists in sequentially dividing blocks of plastic material on horizontal planes so as to produce packages, each comprising a plurality of slabs, one of which is thinner than the others, arranging said packages so that the thin slabs are on top, then drying said packages, then arranging said packages in tiers with the slabs standing on edge and with each package disposed at an angle relative to the next adjacent package and with the end portions of the outer faces of the outer slabs of each package at opposite corners thereof in contact with the outer faces of the outer slabs of the next adjacent packages and then firing said packages.

2. The herein described method of producing building slabs which consists in sequentially dividing blocks of plastic material on horizontally disposed parallel planes so as to form packages of slabs arranging said packages in tiers with the slabs vertically disposed and with only the end portions of the side faces of said packages at oppositely disposed corners thereof in contact with each other and then burning said packages.

3. The herein described method of producing building slabs which consists in sequentially dividing blocks of plastic material on horizontally disposed parallel planes to form packages of slabs, one of the outer slabs of each package being thinner than the other slabs in the package, arranging said packages with the thin slabs uppermost, then drying said packages, then arranging said packages so that the slabs therein are vertically disposed then arranging said packages in tiers with each package occupying an angular position with respect to the next adjacent package with the vertical edges at an oppositely disposed pair of corners of each package in contact with each other and then burning said packages.

4. The herein described method of producing building slabs which consists in cutting substantially rectangular blocks of plastic material lengthwise to form packages of superimposed slabs then drying said packages, then arranging said packages in tiers with the slabs standing on edge and with each package occupying a horizontally disposed angular position relative to the next adjacent packages so that said packages are in contact with each other only at diagonally opposite corners of said packages and then burning said packages.

5. The herein described method of producing building slabs, which consists in cutting substantially rectangular blocks of plastic material lengthwise to form packages of superimposed slabs then drying said packages, then arranging said packages in tiers, with the packages in each tier disposed substantially at right angles relative to the packages in the next adjacent tiers with the slabs in said packages standing on edge and with each package occupying a horizontally disposed angular position relative to the next adjacent packages so that said packages are in contact with each other only at diagonally opposite corners of said packages and then burning said packages.

RICHARD HEDRICH.